June 12, 1956  E. L. COX  2,750,231
MIXING AND SPRAYING DEVICE
Filed June 16, 1955
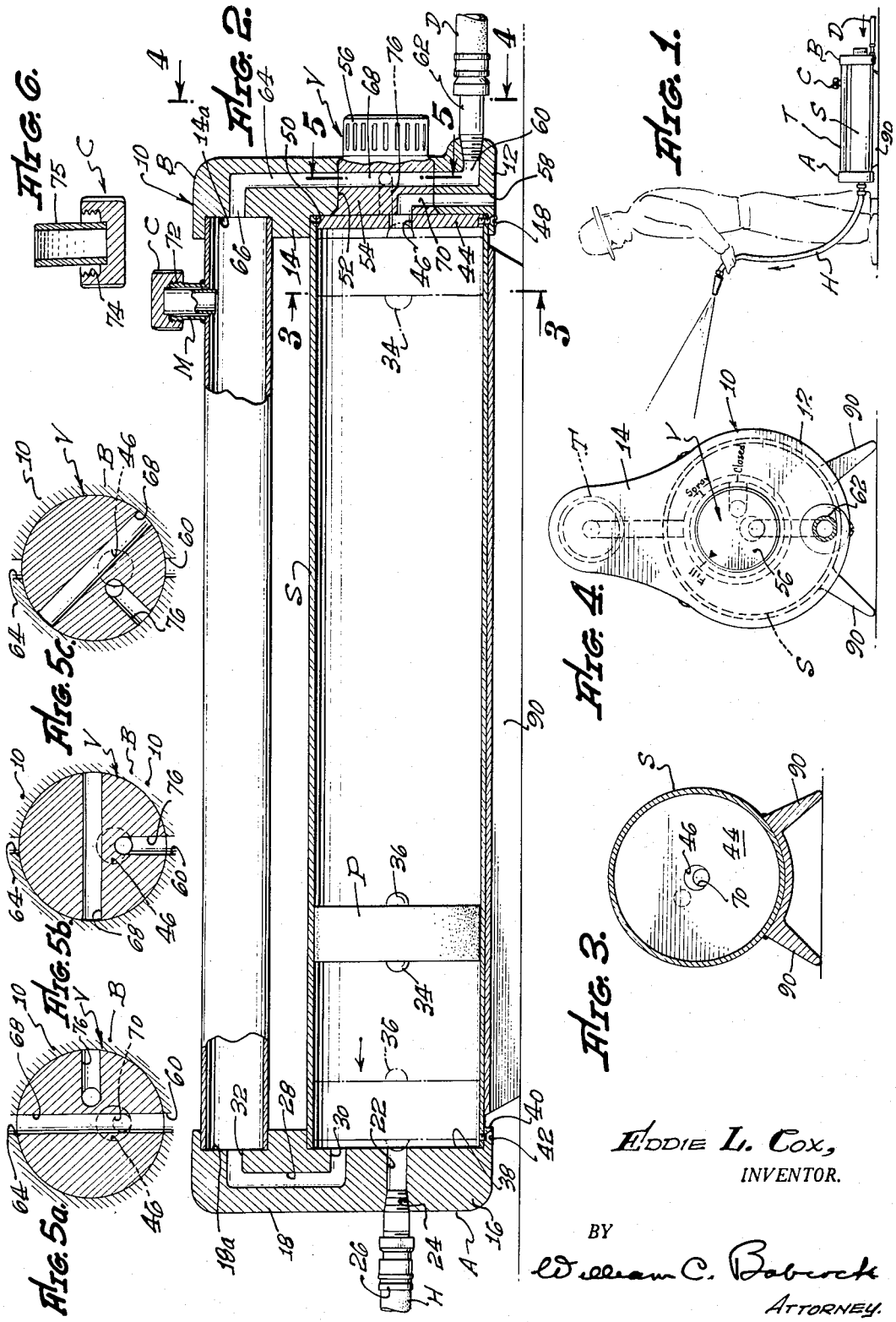
Eddie L. Cox,
INVENTOR.
BY
William C. Babcock
ATTORNEY.

United States Patent Office 2,750,231
Patented June 12, 1956

2,750,231
MIXING AND SPRAYING DEVICE
Eddie L. Cox, Redondo Beach, Calif.
Application June 16, 1955, Serial No. 516,017
5 Claims. (Cl. 299—85)

The present invention relates generally to the field of material mixing and spraying devices, and more particularly to a device in which a material can be mixed with or dissolved in a predetermined quantity of water and the mixture thereafter discharged therefrom under pressure provided by the normal municipal water system.

A major object of the present invention is to provide a lightweight, portable mixing and spraying device that is suitable for use by a professional gardener or home owner in the spraying of vegetation with water containing an insecticide, or should it be desired, the device can be utilized in the application of a solution of fertilizer.

Another object of the invention is to provide a mixing and spraying device which is adapted to not only be filled with a predetermined quantity of water from a domestic source, but from which this quantity of water containing the desired material may be discharged as a spray by means of water under pressure derived from the same water source as used in the filling thereof.

Yet another object of the invention is to supply a device that may be easily and quickly filled with water in which the desired material is mixed or dissolved, and from which the mixture may be discharged without disconnecting it from a hose extending therefrom to a source of domestic water under pressure.

A still further object of the invention is to provide a device that can be fabricated from standard commercially available materials, does not require any elaborate manufacturing facilities for the production thereof, and may be marketed at sufficiently low cost as to encourage its widespread use.

Still another object of the invention is to provide a device that is easily controlled by a manually operable valve mechanism mounted thereon, and one which automatically seals the liquid discharge port and inlet port when a piston associated therewith is so disposed that all liquid has been discharged therefrom, and when the device is completely filled with a material containing liquid.

These and other objects and advantages of the invention will become apparent from the following description thereof, taken in conjunction with the accompanying drawings in which:

Figure 1 is a side elevational view of the invention shown connected to a domestic water supply with the material containing water being discharged therefrom;

Figure 2 is a longitudinal cross-sectional view of the device;

Figure 3 is a transverse cross-sectional view of the device taken on line 3—3 of Figure 2;

Figure 4 is an end elevational view of the invention;

Figure 5a is a cross-sectional view of the valve member shown in a first position to fill the invention with a material containing liquid;

Figure 5b is a cross-sectional view of the valve member shown in a second position to cause material containing liquid to be discharged from the invention;

Figure 5c is a cross-sectional view of the valve member shown in the closed position;

Figure 6 is a cross-sectional view of the combined material measuring cup and cap utilized on the invention.

Referring now to the drawing for the general arrangement of the invention, it will be seen that it includes an elongate cylindrical shell S in which a piston P is slidably mounted, one end of which shell is sealed by a first closure A with the opposite end being sealed by a second closure B. An elongate tube T is disposed parallel to shell S, preferably thereabove, and is adapted to have domestic water discharged thereto by means of a valve V. Material such as an insecticide, fertilizer, or the like may be introduced into tube T through an upwardly extending tubular member M that is preferably closed by a combination material measuring cup and cap C. Tube T not only serves the above-mentioned function, but as a handle as well for carrying the device from place to place.

The invention also embodies a first hose H through which the material containing liquid is discharged from the shell S by water under pressure that is admitted to the shell for this purpose through a second hose D.

In detail, the valve V includes a body 10 having a lower portion 12 of generally annular shape, which portion develops on its upper part into an elongate neck 14. Closure A is of the same general configuration as body 10 and comprises a lower portion 16 of annular shape and an upwardly extending neck 18. The inwardly disposed faces of necks 14 and 18 have cavities 14a and 18a formed therein which snugly receive the end portions of tube T and effect a liquid-tight seal therewith.

As may be seen in Figure 2, a liquid passage 22 extends through closure A, and this passage terminates on its outer portion in a tapered section 24 that has a hose connection 26 extending therefrom. Connection 26 is adapted to have the hose H mounted thereon. A generally U-shaped passage 28 extends from a position 30 on the interior surface of closure A to a position 32 where it is communicates with the interior of tube T.

First and second projections 34 and 36 are formed on opposite sides of piston P. Projection 34 seats in the inwardly disposed portion of passage 22 when piston P is disposed adjacent the first closure A for reasons which will hereinafter be explained in detail. First closure A is formed with a slight recess 28 that defines an annular lip 40. Lip 40 snugly engages one of the exterior end surfaces of shell S and is removably held thereon by screws 42, or other conventional fastening means.

Second closure B is simply an annular plate 44 in which a centrally disposed liquid passage 46 is formed. Closure B is held in position in shell S by screws 48 or the like. Valve body 10 has a cavity 50 formed on the inwardly disposed face of portion 12 thereof, snugly positioned in cavity 50.

An annular opening 52 extends through valve body 10 which body serves to rotatably support a valve member 54 that is provided with a suitable handle 56 projecting therefrom. In Figure 2 it will be seen that valve body 10 has a liquid passage 58 that serves as a drain, and an L-shaped passage 60 having a hose connection 62 projecting therefrom. This connection is affixed in liquid communication with the hose D. The valve body 10 also has a liquid passage 64 of generally L-shape extending from opening 52 to a position 66 in communication with the interior of the tube T.

Valve member 54 is provided with a liquid passage 68 that is in communication with passages 60 and 64 when the valve is in the filling position shown in Figure 5a. During the initial filling of the device, the piston P is disposed adjacent the first closure 18, the piston having been moved into this position by liquid admitted under pressure into the confines of the shell S on the right-hand side of the piston. This liquid must be discharged from the shell to permit the piston to move to the right as shown in Figure 2 in filling the device. Accordingly, member 54 is also formed with a passage 70 of L-shaped configuration that effects communication between the passages 46 and 58 when the valve member is in the first position.

Such material as insecticide or fertilizer is introduced into tube T by means of tubular member M before the filling operation. Member M is provided with threads 72 that are removably engaged by threads 74 on the cap. A measuring cup 75 which may be employed in placing the material in the tube T depends from cap C, and is of such dimensions as to permit slidable insertion thereof within member M when the cap is in liquid sealing position thereon.

When it is desired to discharge the material containing liquid from the invention, valve member 54 is rotated to the second position shown in Figure 5b. A passage 76 formed in valve member 54 is then in communication with passages 46 and 60 and water may be discharged into the shell S from hose D to move piston P to the left as shown in Figure 2. This piston movement to the left forces material containing liquid from hose H until projection 34 seats in passage 22, which prevents all further discharge of liquid from the invention until the piston is again moved to the right during filling.

When the device is not in use, the valve member 54 is rotated to the position shown in Figure 5c whereby no liquid can enter or escape from the invention inasmuch as the passages are out of communication one with the other.

The use and operation of the invention has been previously described in detail hereinabove and need not be repeated herein.

The shell S may be supported in a variety of ways above the ground surface, but it has been found from experience convenient to employ two parallel longitudinally extending legs 90 for this purpose, as shown in Figure 4. The invention is obviously susceptible to fabrication from many different materials. A tough synthetic material is preferable for this purpose as it is more weather resistant, light in weight, and sufficiently strong to withstand the normal physical handling to which the device will be subjected.

Although the invention herein shown and described is fully capable of achieving the objects and providing the advantages hereinbefore mentioned, it is to be understood that it is merely illustrative of the presently preferred embodiment of the device and it is not intended to be limited to the details of construction as shown and described other than as defined in the appended claims.

The invention claimed is:
1. A device which mixes liquid containing a desired material and discharges same therefrom as a spray, including: an elongate cylindrical shell; a piston freely slidable within the confines of said shell, which piston effects a fluid-tight seal with the interior shell surface; an elongate tube disposed parallel to said shell; means to introduce said material into said tube; a first closure having a first passage extending therethrough to which a first hose can be connected when said closure is mounted in one end of said shell, which closure has a second passage formed therein connecting the interior end portion of said shell adjacent said first closure to the interior of said tube; a second closure mounted in the opposite end of said shell in which said first closure is mounted, which second closure has a third liquid passage formed therethrough; a valve body having a longitudinally extending annular opening formed therein that encloses said second closure, which valve body has a fourth liquid passage extending from said opening to the interior of said tube and fifth and sixth liquid passages that serve as a drain and connecting means for a second hose respectively; a manually rotatable valve member provided with seventh, eighth and ninth liquid passages that is mounted in said opening, which member when rotated to a first position so disposes said seventh passage as to effect communication with said fourth and sixth passages to permit said shell to be filled with said liquid and so disposes said ninth passage as to effect communication between said third and fifth passages, with said member when rotated to a second position establishing liquid communication between said third, sixth and eighth passages only, which member when rotated to a third position obstructs liquid flow through said fourth, fifth and sixth passages; and means to support said shell at an elevated position above the ground surface.

2. A device as defined in claim 1 in which said piston has first and second projections formed on opposite sides thereof, which first projection seat in said first passage when said piston is disposed adjacent said first closure and said second projection is seated in said third passage when said piston is disposed adjacent said second closure.

3. A device as defined in claim 2 in which said means to introduce said material is a threaded tubular member extending upwardly from said tube and having a threaded cap removably affixed thereto.

4. A device as defined in claim 3 in which said cap is provided with a material measuring cup that can occupy a concealed position within the confines of said tubular member.

5. A device as defined in claim 4 in which said support means are two parallel, laterally spaced ribs affixed to the lower portion of said shell.

References Cited in the file of this patent
UNITED STATES PATENTS

| | | |
|---|---|---|
| 547,725 | Lawrans | Oct. 8, 1895 |
| 1,372,292 | Johnson | Mar. 22, 1921 |
| 1,754,710 | Davenport | Apr. 15, 1934 |
| 2,096,554 | Maehr | Oct. 19, 1937 |